United States Patent
Singer et al.

(10) Patent No.: US 10,795,000 B2
(45) Date of Patent: Oct. 6, 2020

(54) LASER DISTANCE AND RANGING (LADAR) APPARATUS, ARRAY, AND METHOD OF ASSEMBLING THEREOF

(71) Applicant: The Boeing Company, Huntington Beach, CA (US)

(72) Inventors: Scott Singer, Sherman Oaks, CA (US); Robert Douglas Moss, Sylmar, CA (US)

(73) Assignee: The Boeing Company, Chicago, IL (US)

( * ) Notice: Subject to any disclaimer, the term of this patent is extended or adjusted under 35 U.S.C. 154(b) by 1097 days.

(21) Appl. No.: 14/796,518

(22) Filed: Jul. 10, 2015

(65) Prior Publication Data

US 2017/0328987 A1  Nov. 16, 2017

(51) Int. Cl.
| | |
|---|---|
| *G01C 3/08* | (2006.01) |
| *G01S 7/481* | (2006.01) |
| *G01S 17/10* | (2020.01) |
| *G01S 7/4863* | (2020.01) |
| *G01S 17/42* | (2006.01) |
| *G01S 17/87* | (2020.01) |

(52) U.S. Cl.
CPC ........... *G01S 7/4811* (2013.01); *G01S 7/4817* (2013.01); *G01S 7/4863* (2013.01); *G01S 17/10* (2013.01); *G01S 17/42* (2013.01); *G01S 17/87* (2013.01)

(58) Field of Classification Search
CPC .... G01S 7/4811; G01S 7/4817; G01S 7/4863; G01S 17/10; G01S 17/42; G01S 17/87
See application file for complete search history.

(56) References Cited

U.S. PATENT DOCUMENTS

| | | |
|---|---|---|
| 5,529,138 A | 6/1996 | Shaw et al. |
| 8,752,969 B1 | 6/2014 | Kane et al. |
| 2006/0132752 A1 | 6/2006 | Kane |
| 2010/0053330 A1 | 3/2010 | Hellickson et al. |
| 2010/0165322 A1 | 7/2010 | Kane et al. |
| 2013/0235441 A1* | 9/2013 | Davis ...................... G02F 1/29 359/204.4 |
| 2013/0242284 A1 | 9/2013 | Zeng |

(Continued)

FOREIGN PATENT DOCUMENTS

EP    2806288 A1    11/2014

OTHER PUBLICATIONS

Moss, Robert Douglas et al.; Co-pending U.S. patent application entitled Systems and Methods for Modular Ladar Scanning; U.S. Appl. No. 14/687,201, filed Apr. 15, 2015; 16 pp.

(Continued)

*Primary Examiner* — Samantha K Abraham
(74) *Attorney, Agent, or Firm* — Armstrong Teasdale LLP

(57) ABSTRACT

A laser distance and ranging (LADAR) apparatus is provided. The LADAR apparatus includes a first substrate, a LADAR module coupled to the first substrate, and an actuation unit coupled between the first substrate and the LADAR module. The LADAR module is configured to scan with a predetermined field of view in a first viewing position from said LADAR module, and the actuation unit is selectively operable to modify an orientation of the LADAR module such that the predetermined field of view moves from the first viewing position towards a second viewing position from the LADAR module.

20 Claims, 7 Drawing Sheets

(56) References Cited

U.S. PATENT DOCUMENTS

2013/0242285 A1* 9/2013 Zeng ................... G01S 17/58
    356/28
2014/0340487 A1 11/2014 Gilliland et al.
2014/0350836 A1 11/2014 Stettner et al.
2016/0291134 A1* 10/2016 Droz ................... G01S 7/4802
2016/0313445 A1* 10/2016 Bailey ................. G01S 7/481

OTHER PUBLICATIONS

Combined Search and Examination Report of Application No. GB1606584.9, dated Jun. 6, 2016, 6 pages.

* cited by examiner

LASER DISTANCE AND RANGING (LADAR) APPARATUS, ARRAY, AND METHOD OF ASSEMBLING THEREOF

BACKGROUND

The field of the present disclosure relates generally to laser distance and ranging (LADAR) systems and, more particularly, a device for use in modifying the field of view of LADAR modules included in the LADAR systems.

Laser distance and ranging (LADAR) systems generate images by transmitting a laser, collecting scatter information when the laser contacts an object, and generating an image using the scatter information. At least some known LADAR systems have a lateral field of view (FOV) of approximately 50°. To increase this FOV, different techniques may be implemented.

For example, at least some known LADAR systems use one or more laser beams that are generated by mounting a laser source onto a rotating gimbal. The laser source is then rotated and a plurality of images are acquired at different angles and combined to form a single image. However, such LADAR systems rely on a time-of-flight concept to acquire backscatter information, which is relatively time-consuming when compared to flash time-of-flight systems. Specifically, the laser source must be rotated at a sufficiently slow speed to enable the laser beam to be transmitted to the object and receive backscatter from the object. At least some known LADAR systems having larger FOVs are relatively complex, relatively expensive, and relatively difficult to repair.

BRIEF DESCRIPTION

In one aspect, a laser distance and ranging (LADAR) apparatus is provided. The LADAR apparatus includes a first substrate, a LADAR module coupled to the first substrate, and an actuation unit coupled between the first substrate and the LADAR module. The LADAR module is configured to scan with a predetermined field of view in a first viewing position from said LADAR module, and the actuation unit is selectively operable to modify an orientation of the LADAR module such that the predetermined field of view moves from the first viewing position towards a second viewing position from the LADAR module.

In another aspect, a laser distance and ranging (LADAR) array is provided. The LADAR array includes a plurality of LADAR modules and an actuation unit coupled to each LADAR module defining a plurality of actuation units. Each LADAR module is configured to scan with a predetermined field of view in a viewing position from each LADAR module, and the plurality of actuation units are selectively operable to modify an orientation of at least one LADAR module of the plurality such that the viewing position for the predetermined field of view of the at least one LADAR module moves relative to the viewing position for the predetermined field of view of a different LADAR module.

In yet another aspect, a method of assembling a laser distance and ranging (LADAR) array is provided. The method includes arranging a plurality of LADAR modules, wherein each LADAR module has a predetermined field of view oriented in a viewing position. The method also includes coupling an actuation unit to each LADAR module defining a plurality of actuation units, wherein said plurality of actuation units are selectively operable to modify an orientation of at least one LADAR module of the plurality such that the viewing position for the predetermined field of view of the at least one LADAR module moves relative to the viewing position for the predetermined field of view of a different LADAR module.

DETAILED DESCRIPTION

The implementations described herein relate to a laser distance and ranging (LADAR) array including a plurality of separate LADAR modules and an actuation unit coupled to each LADAR module. A central processing device combines signals from each of the plurality of LADAR modules to generate an output (e.g., a three-dimensional image of an environment in the fields of view (FOVs) of the LADAR modules). By using a plurality of LADAR modules, a total FOV and an image resolution of the array are greater than the FOV and image resolution of a single LADAR module operating alone. Further, the individual LADAR modules are relatively inexpensive, relatively small, and not overly complex, reducing the cost of the LADAR array described herein relative when compared to other LADAR systems having a relatively large FOV. However, in an array including a plurality of separate LADAR modules, it may be difficult to align the FOVs of each LADAR module. As such, the actuation unit coupled to each LADAR module facilitates providing fine-tune adjustments of the orientation for the plurality of LADAR modules without having to modify each LADAR module itself.

Figure 1:
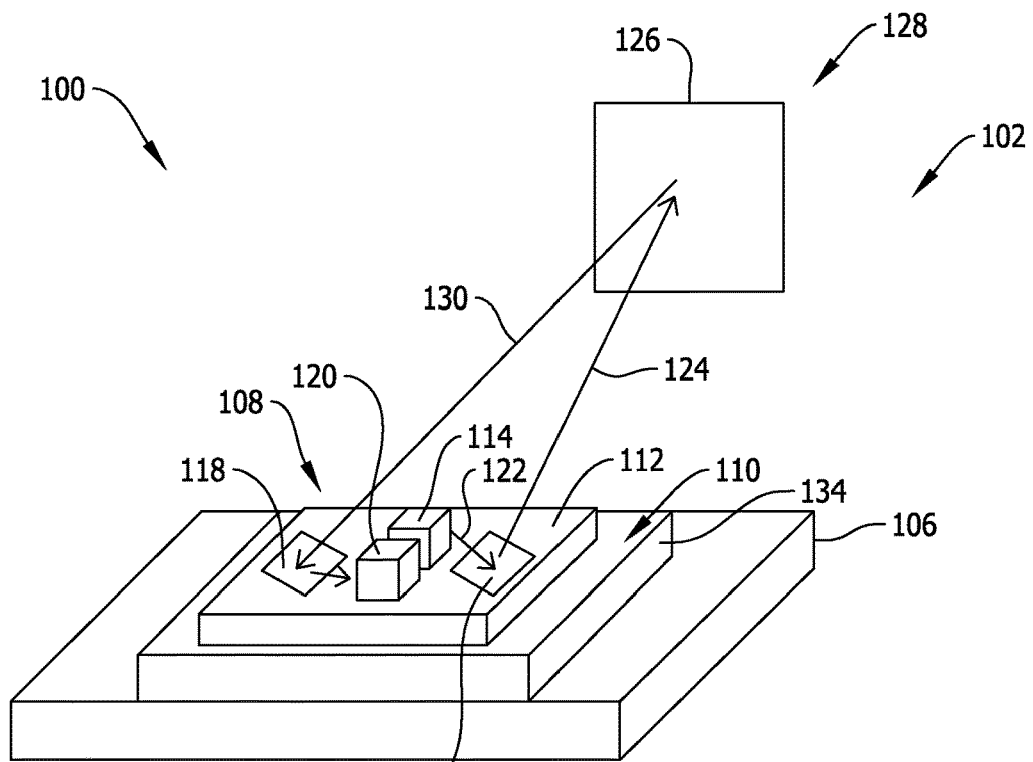
FIG. 1 is an illustration of an exemplary laser distance and ranging (LADAR) apparatus in a first operational position.
Figure 2:
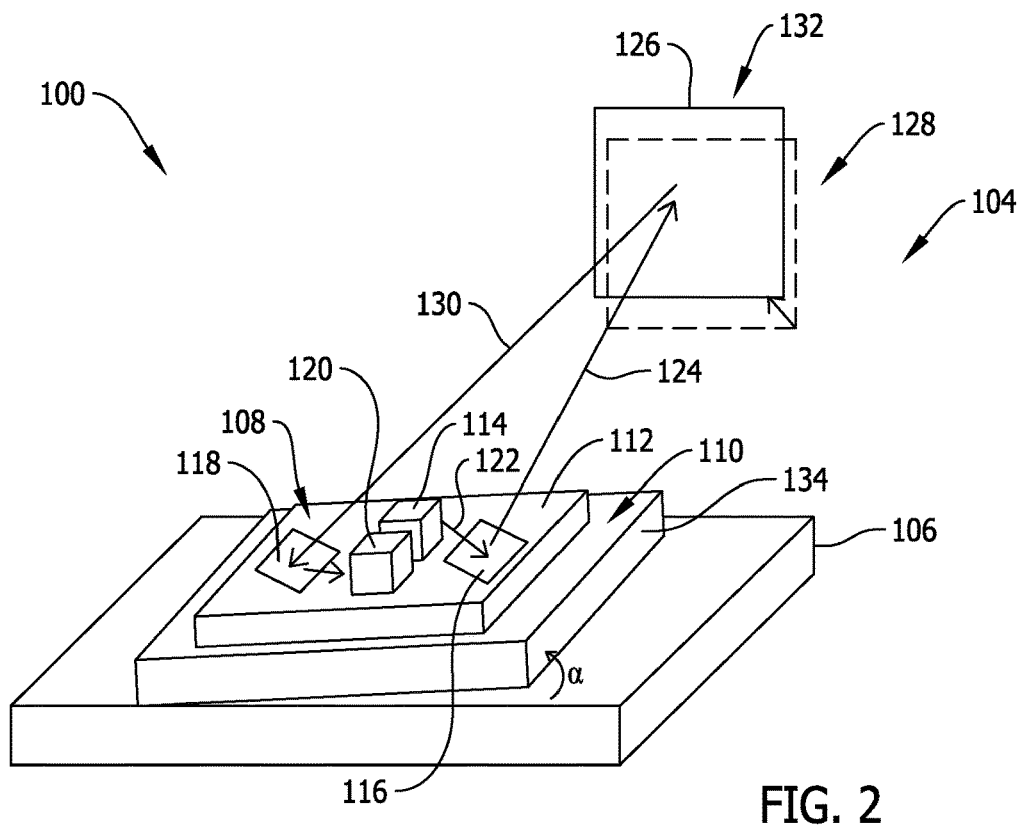
FIG. 2 is an illustration of the LADAR apparatus shown in FIG. 1 in a second operational position.

FIG. 1 is an illustration of an exemplary laser distance and ranging (LADAR), or light detection and ranging (LIDAR), apparatus 100 in a first operational position 102, and FIG. 2 is an illustration of LADAR apparatus 100 in a second operational position 104. In the exemplary implementation, LADAR apparatus 100 includes a first substrate 106, a LADAR module 108 coupled, indirectly, to first substrate 106, and an actuation unit 110 coupled between first substrate 106 and LADAR module 108. LADAR module 108 includes a LADAR chip 112 and a plurality of scanning components coupled to LADAR chip 112. The scanning components include a light source 114, a two-axis scan mirror 116 (i.e. a mirror capable of rotating about two separate rotational axes (e.g., a tip axis and a tilt axis) that are orthogonally oriented relative to each other), a light receiver 118, and a processing device 120. In an alternative implementation, LADAR module 108 may include any combination of scanning components. For example, LADAT module 108 may include multiple receivers/pixels on a single chip and/or the processing device may be located remotely from the chip.

In operation, light source 114 directs a laser beam 122 towards mirror 116 and light reflected from mirror 116 is in the form of a reflected laser beam 124. Laser beam 122 may be of any type or have any wavelength that has been collimated into a beam having a relatively low divergence. As laser beam 122 is directed towards mirror 116, mirror 116 rotates or tilts such that reflected laser beam 124 scans, or sweeps, across an environment to generate a three-dimensional map, or image, of the environment. Mirror 116 generally has a finite size and scan angle such that LADAR module 108 scans the environments with a predetermined field of view 126 in a first viewing position 128 from LADAR module 108. As used herein, "scan angle" refers to the angle in which mirror 116 can sweep reflected laser beam 124 about the tip axis or the tilt axis to define predetermined field of view 126. A scan angle may be, for example, about 25° in both the horizontal and vertical directions. In the exemplary implementation, mirror 116 is a microelectromechanical system (MEMS) mirror having a relatively small size, weight, and power. Alternatively, mirror 116 may be any mirror that enables LADAR module 108 to function as described herein.

When scanning the environment, reflected laser beam 124 is scanned towards at least one object (not shown) in predetermined field of view 126 within the environment, reflected laser beam 124 impinges against the object, and a reflected laser beam 130 is received at light receiver 118. Light receiver 118 is coupled in communication with processing device 120, which determines and outputs a signal indicative of a distance between LADAR module 108 and the object that reflected laser beam 122 is incident upon.

As described above, actuation unit 110 is coupled between first substrate 106 and LADAR module 108. Referring to FIG. 2, actuation unit 110 is selectively operable to modify an orientation of LADAR module 108 such that predetermined field of view 126 moves from first viewing position 128 towards a second viewing position 132 from LADAR module 108. More specifically, as will be described in more detail below, at least a portion of actuation unit 110 is capable of rotating, bending, or otherwise deforming to modify the orientation of LADAR module 108 by angle α in one or more axes relative to first substrate 106.

In the exemplary implementation, actuation unit 110 includes at least one piezoelectric element 134 coupled between first substrate 106 and LADAR module 108. Piezoelectric element 134 is formed from a piezoelectric material that rotates, bends, or deforms when subjected to a stimuli, such as electricity. Examples of suitable piezoelectric material include, but are not limited to, naturally-occurring crystalline material, synthetic crystalline material, and synthetic ceramic material. As such, piezoelectric element 134 selectively biases LADAR module 108 to modify the orientation thereof when a bias voltage is applied to the at least one piezoelectric element 134. Alternatively, piezoelectric element 134 is a shape memory alloy element that rotates, bends, or deforms when subjected to a stimuli, such as heat.

Figure 3:
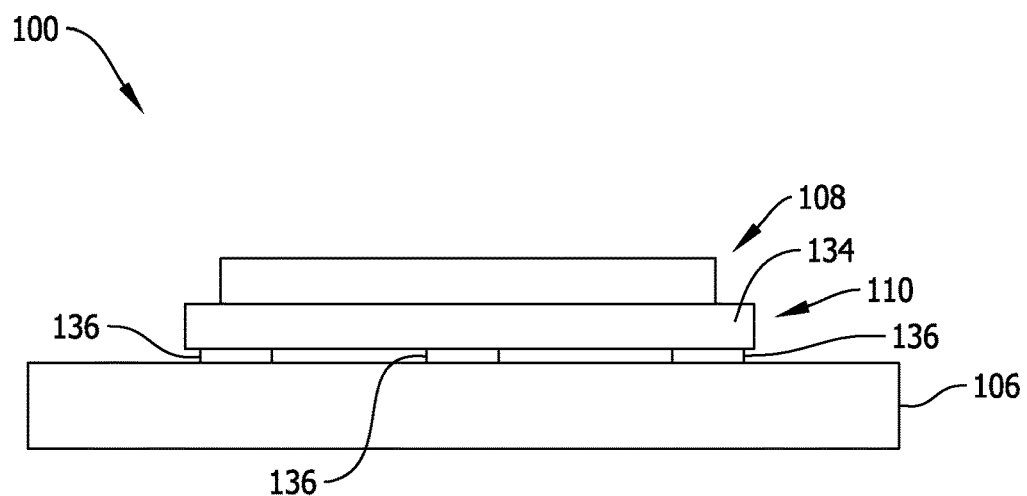
FIG. 3 is a side view illustration of the LADAR apparatus shown in FIG. 1.

FIG. 3 is a side view illustration of LADAR apparatus 100. In the exemplary implementation, piezoelectric element 134 is a substantially rectangular sheet extending across at least a portion of first substrate 106. Alternatively, LADAR apparatus 100 may include one or more piezoelectric elements 134 extending between first substrate 106 and LADAR module 108 in any configuration that enables LADAR apparatus 100 to function as described herein. LADAR apparatus also includes a plurality of voltage control circuits 136 coupled at different positions along piezoelectric element 134. Voltage control circuits 136 are electrically coupled to a power supply (not shown), or each include an independent power source. As such, in operation, voltage control circuits 136 selectively apply one or more bias voltages to piezoelectric element 134 at different times to move predetermined field of view 126 (shown in FIGS. 1 and 2) in more than one direction. For example, voltage control circuits 136 each apply a localized stimuli at different locations along piezoelectric element 134. Alternatively, voltage control circuits 136 apply bias voltages of varying intensities are applied to piezoelectric element 134. As such, piezoelectric element 134 responds to the localized stimuli applied by the one or more voltage control circuits 136 to facilitate deforming piezoelectric element 134 in a predefined and substantially predictable manner to facilitate modifying the orientation of LADAR module 108.

Figure 4:
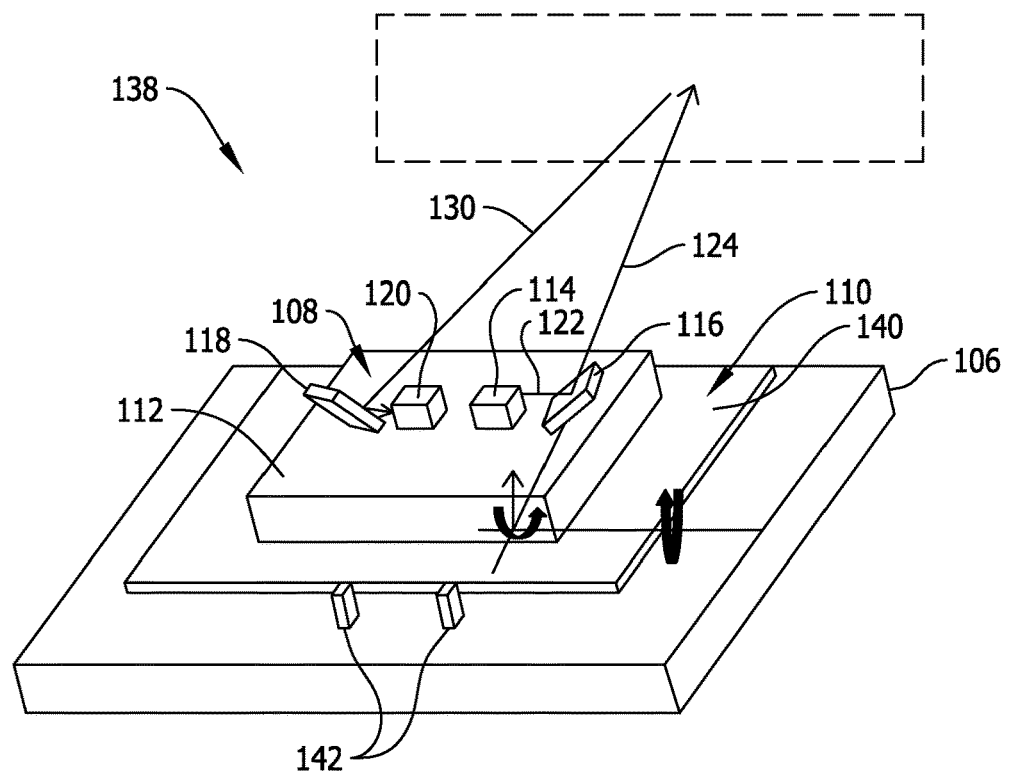
FIG. 4 is an illustration of an alternative LADAR apparatus.

FIG. 4 is an illustration of an alternative LADAR apparatus 138. In the exemplary implementation, LADAR apparatus 138 includes a second substrate 140 coupled between first substrate 106 and LADAR module 108, and coupled between actuation unit 110 and LADAR module 108. LADAR apparatus 138 also includes a plurality of piezoelectric elements 142 coupled at different positions between first substrate 106 and second substrate 140. For example, in one implementation, second substrate 140 has a substantially rectangular shape and the plurality of piezoelectric elements 142 are coupled at different positions along a periphery of second substrate 140. One or more of the plurality of piezoelectric elements 142 selectively bias second substrate 140 to modify the orientation of LADAR module 108 when the bias voltage is applied to piezoelectric elements 142. More specifically, each piezoelectric element 142 includes a voltage control circuit (not shown) coupled to a power supply, such that each piezoelectric element 142 is independently operable at different times to move predetermined field of view 126 in more than one direction. As such, the orientation of second substrate 140 can be modified in a predefined and substantially predictable manner to facilitate modifying the orientation of LADAR module 108.

Figure 5:
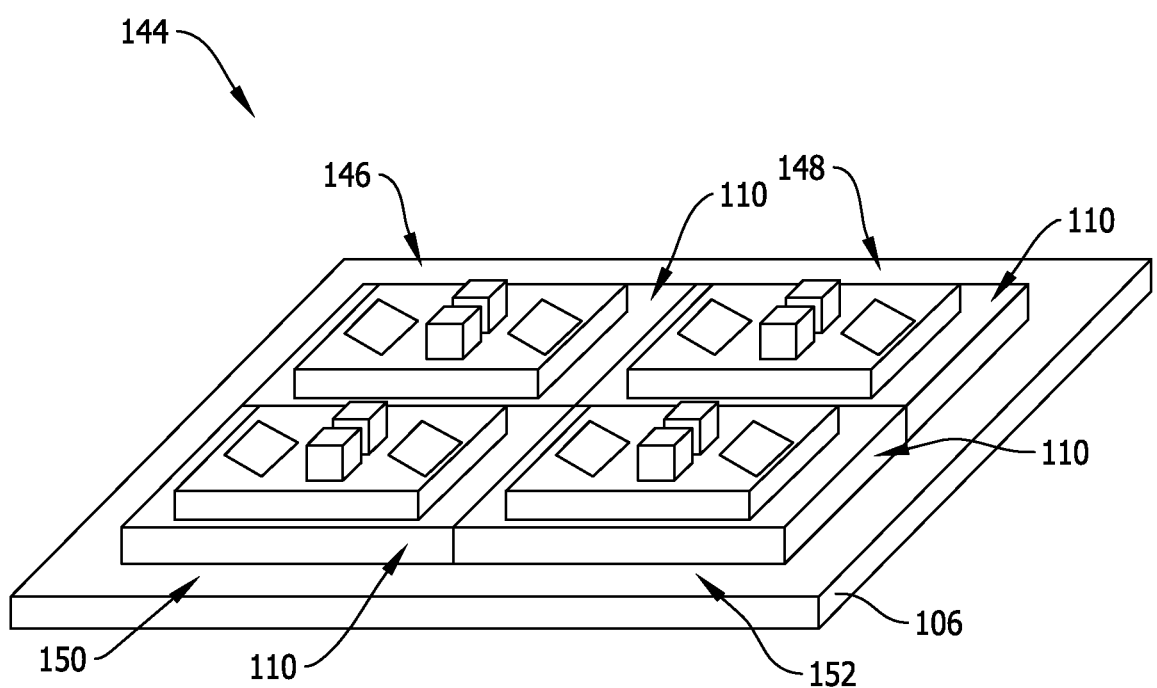
FIG. 5 is an illustration of an exemplary LADAR array.

FIG. 5 is an illustration of an exemplary LADAR array 144. In the exemplary implementation, LADAR array 144 includes a plurality of LADAR modules 108. More specifically, LADAR array 144 includes a first LADAR module 146, a second LADAR module 148, a third LADAR module 150, and a fourth LADAR module 152 each coupled to first substrate 106. Each LADAR module 108 scans with a predetermined field of view in a viewing position from each LADAR module 108. As will be described in more detail below, the predetermined fields of view for each LADAR module 108 either do not overlap with each other, at least partially overlap with each other, or entirely overlap with each other. Moreover, while shown as including four LADAR modules 108, it should be understood that LADAR array 144 can include any number of LADAR modules 108 that enable it to function as described herein.

An actuation unit 110 is coupled to each LADAR module 108, thereby defining a plurality of actuation units 110. The plurality of actuation units 110 are selectively operable to modify an orientation of at least one LADAR module 108 of the plurality such that the viewing position for the predetermined field of view of the at least one LADAR module 108 moves relative to the viewing position for the predetermined field of view of a different LADAR module 108.

Figure 6A:
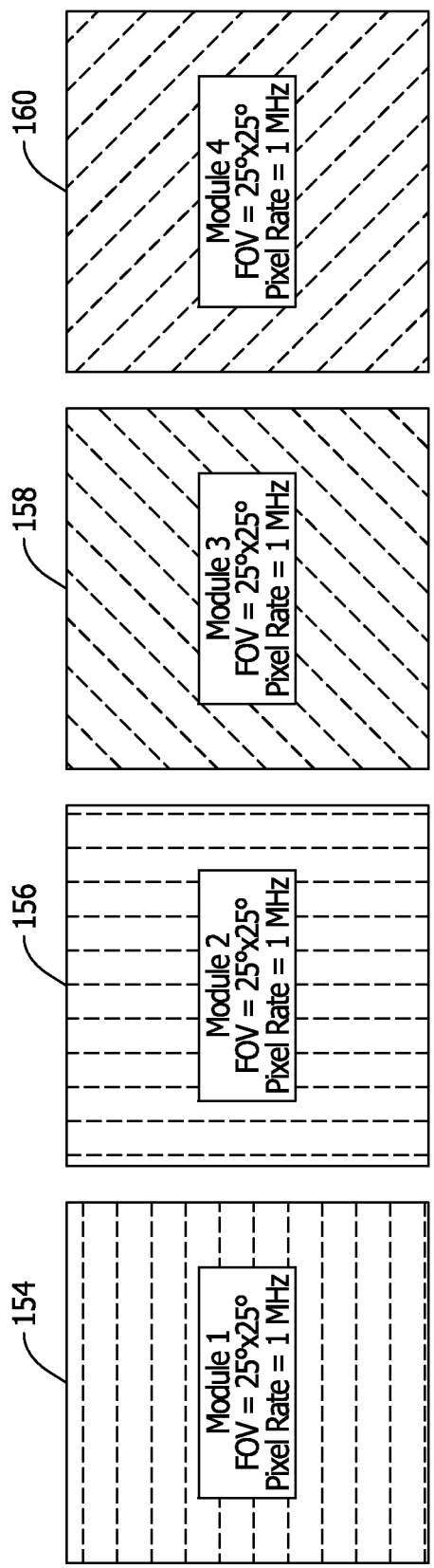
FIGS. 6A-6D are diagrams illustrating examples of how fields of view of the LADAR array shown in FIG. 5 may be combined.

FIGS. 6A-6D are diagrams illustrating how the fields of view of multiple LADAR modules 108 can be combined to cover a wider total field of view and/or at least partially overlap or entirely overlap to increase an imaging resolution. As shown in FIG. 6A, assume first LADAR module 146 has a first predetermined field of view 154 of 25° by 25°, and a pixel rate of 1 megahertz (MHz). Further, assume a second, third, and fourth LADAR modules 148, 150, and 152 each have predetermined fields of view 156, 158, and 160, respectively, having the same parameters.

Figure 6B:
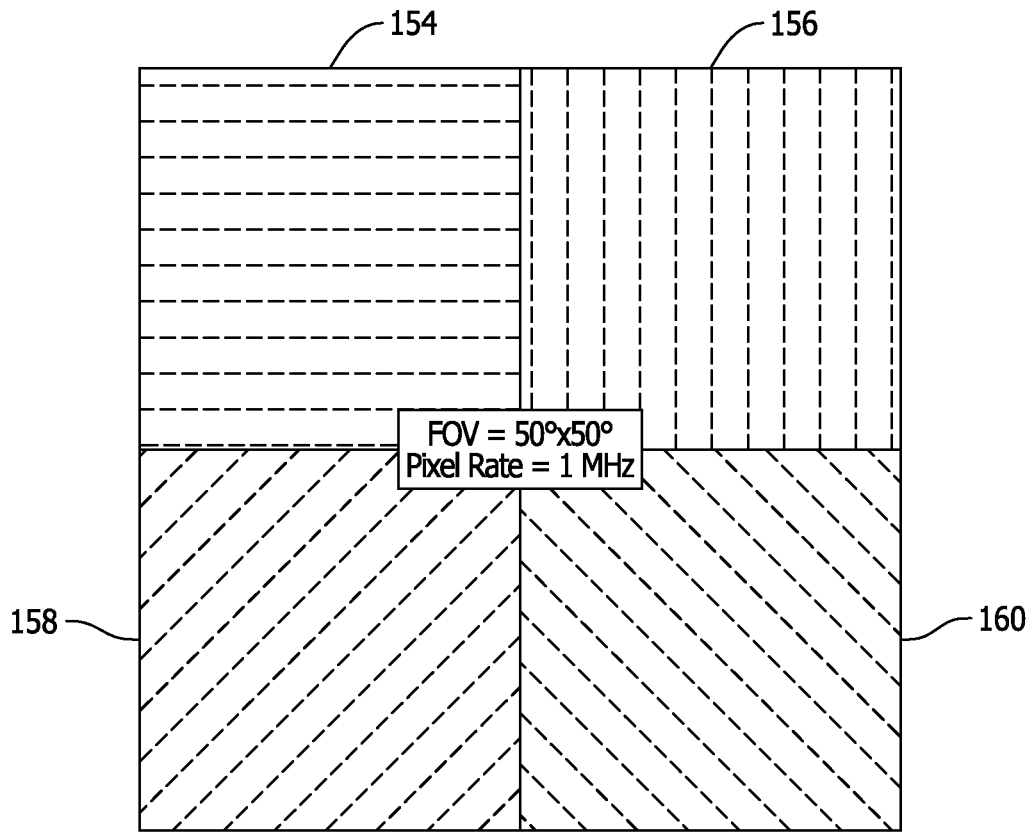
Figure 6C:
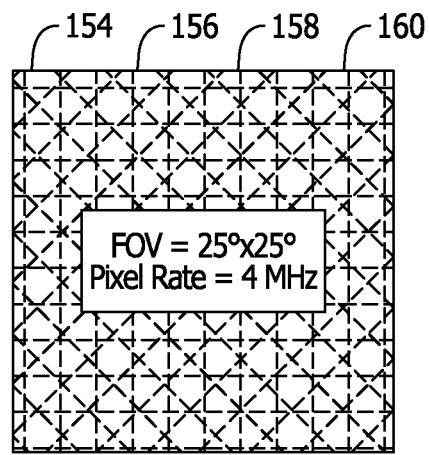

As shown in FIG. 6B, by arranging first, second, third, and fourth LADAR modules 146, 148, 150, and 152 such that the fields of view of modules 146, 148, 150, and 152 are adjacent to but do not overlap with each other, such that a substantially continuous total field of view having dimensions of 50° by 50° with a pixel rate of 1 MHz is defined. Additionally, and as shown in FIG. 6C, by arranging first, second, third, and fourth LADAR modules 146, 148, 150, and 152 such that the fields of view of modules 146, 148, 150, and 152 entirely overlap, the total field of view is the same as it would be for one module (e.g., 25° by 25°), but the pixel rate is now 4 MHz.

Figure 6D:
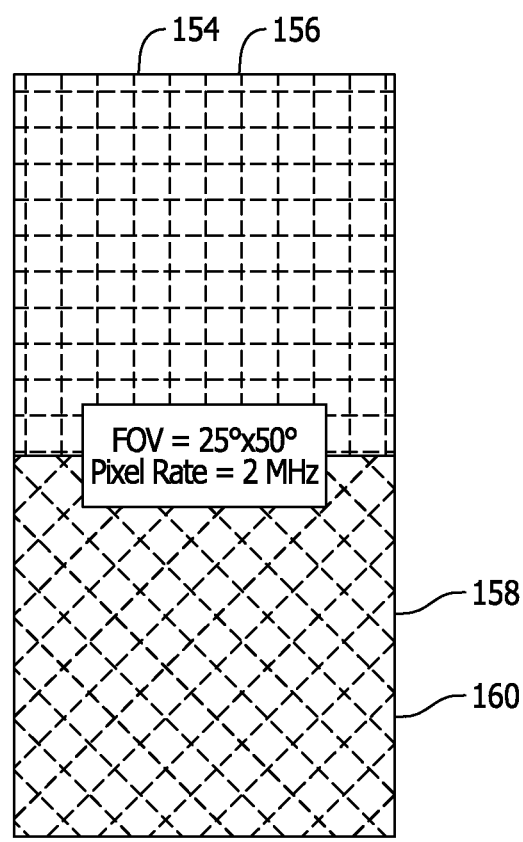

As another example, in FIG. 6D, first and second LADAR modules 146 and 148 are arranged to overlap entirely, and third and fourth LADAR modules 150 and 152 are arranged to overlap entirely. This results in a total field of view of 25° by 50° with a pixel rate of 2 MHz. Notably, the arrangements shown in FIGS. 6B-6D are merely examples, and those of skill in the art will appreciate that many different arrangements of multiple LADAR modules 108 are within the spirit and scope of this disclosure.

In implementations where fields of view of multiple LADAR modules 108 overlap, the phases of the overlapping LADAR modules 108 may be offset to avoid interference. For example, driving of light sources 114 for each LADAR module 108 may be modulated with different parts of the common clock of a central processing device. In some implementations, light sources 114 are controlled such that laser transmit pulses are offset, and such that a time it takes for a first LADAR module to transmit and receive does not overlap with a second LADAR module's transmission.

In some implementations, the predetermined fields of view for LADAR modules 108 in LADAR array 144 need to be moved into alignment with each other to obtain a desired total field of view and/or image resolution for LADAR array 144. For example, in a LADAR array 144 having first LADAR module 146 and second LADAR module 148, first LADAR module 146 has first predetermined field of view 154 in a first viewing position and second LADAR module 148 has second predetermined field of view 126 in a second viewing position different from the first viewing position. Actuation units 110 of at least one of first and second LADAR modules 146 and 148 modify the orientation of at least one of first and second LADAR modules 146 and 148 such that first and second predetermined fields of view 154 and 156 are moved into alignment with each other. In other words, actuation units 110 provide fine-tune adjustments of the viewing positions of first and second predetermined fields of view 154 and 156 to ensure the desired total field of view and/or image resolution is obtained.

As such, in some implementations, actuation units 110 modify the orientation of at least one of first and second LADAR modules 146 and 148 such that first and second predetermined fields of view 154 and 156 at least partially overlap with each other, such that first and second predetermined fields of view 154 and 156 entirely overlap with each other, or such that first and second predetermined fields of view 154 and 156 are positioned adjacent to each other to define a substantially continuous field of view.

Figure 7:
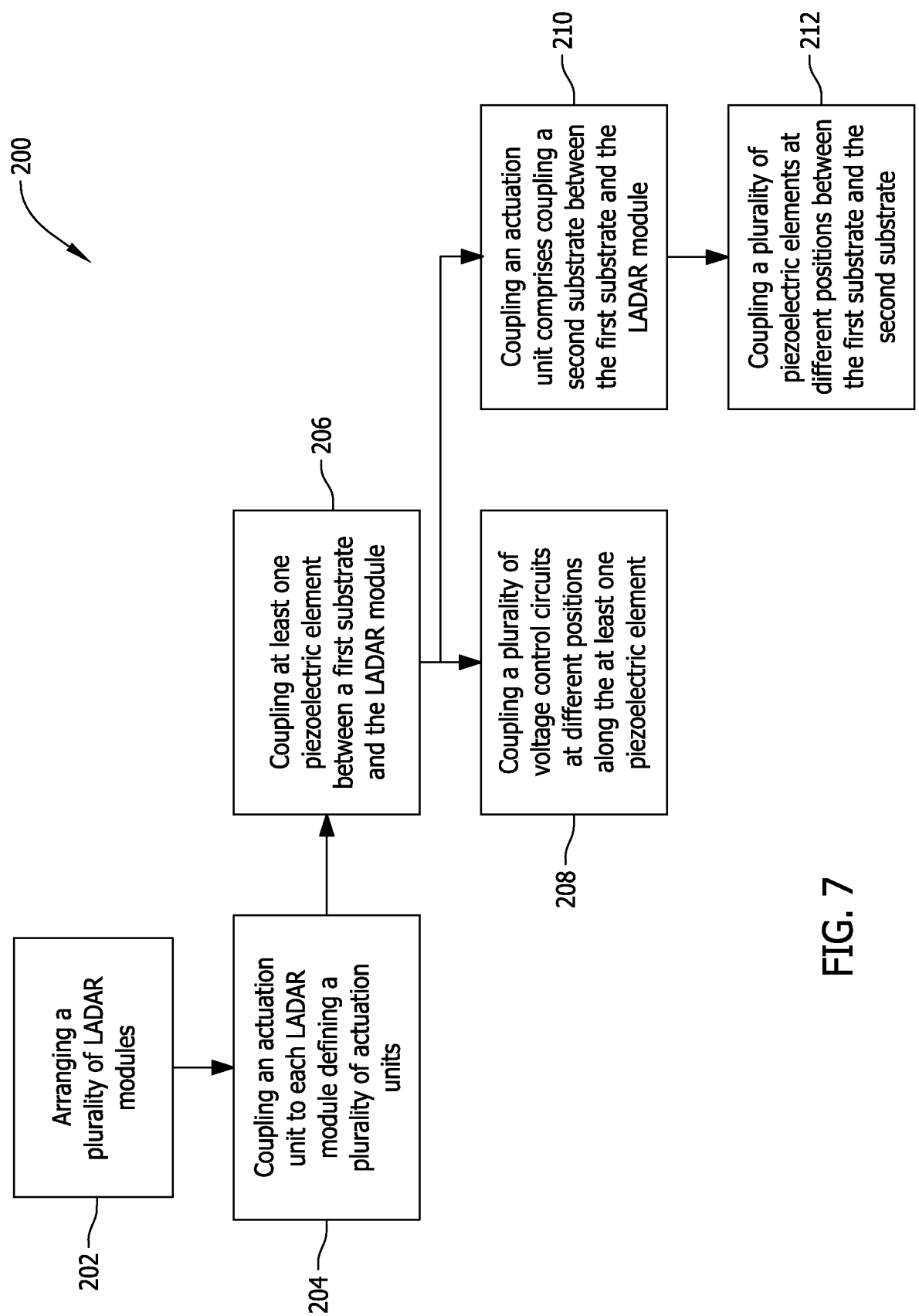
FIG. 7 is a flow diagram illustrating a method of assembling an exemplary LADAR array.

A method of assembling a laser distance and ranging (LADAR) array 144 is also described herein. FIG. 7 is a flow diagram illustrating a method 200 of assembling an exemplary LADAR array. The method includes arranging 202 a plurality of LADAR modules 108, and coupling 204 actuation unit 110 to each LADAR module 108 defining a plurality of actuation units 110. Each LADAR module 108 has a predetermined field of view oriented in a viewing position, and the plurality of actuation units 110 are selectively operable to modify an orientation of at least one LADAR module 108 of the plurality such that the viewing position for the predetermined field of view of the at least one LADAR module 108 moves relative to the viewing position for the predetermined field of view of a different LADAR module 108.

In one implementation, coupling 204 actuation unit 110 includes coupling 206 at least one piezoelectric element 134 between first substrate 106 and LADAR module 108. The at least one piezoelectric element 134 is configured to selectively bias LADAR module 108 to modify the orientation thereof when a bias voltage is applied to the at least one piezoelectric element 134. The method further includes coupling 208 a plurality of voltage control circuits 136 at different positions along the at least one piezoelectric element 134. The plurality of voltage control circuits 136 are configured to apply one or more bias voltages to the at least one piezoelectric element 134 at different times to move the predetermined field of view in more than one direction.

In one implementation, coupling 210 actuation unit 110 includes coupling second substrate 140 between first substrate 106 and LADAR module 108, and between actuation unit 110 and LADAR module 108. The at least one piezoelectric element 134 is configured to selectively bias second substrate 140 to modify the orientation of LADAR module 108 when the bias voltage is applied to the at least one piezoelectric element 134. The method further includes coupling 212 a plurality of piezoelectric elements 142 at different positions between first substrate 106 and second substrate 140. The plurality of piezoelectric elements 142 are configured to selectively bias second substrate 140 at different times to move the predetermined field of view in more than one direction.

The implementations described herein relate to a laser distance and ranging (LADAR) array having a plurality of LADAR modules that each have an actuation unit associated therewith. When using a plurality of LADAR modules, a total FOV and/or an image resolution of the array are greater than the FOV and image resolution of a single LADAR module operating alone. Moreover, the actuation units are selectively operable such that predetermined fields of view for each LADAR module are moved into alignment with each other. As such, the actuation unit coupled to each LADAR module facilitates providing fine-tune adjustments of the orientation for the plurality of LADAR modules in a simplified manner without the need for large and complicated mechanical elements.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A laser distance and ranging (LADAR) apparatus comprising:

a first substrate;

a LADAR module coupled to said first substrate, said LADAR module comprising a chip and a plurality of scanning components coupled to the chip, said plurality of scanning components comprising a light source and a light receiver, wherein said LADAR module is configured to scan with a predetermined field of view in a first viewing position from said LADAR module; and an actuation unit coupled between said first substrate and said chip, wherein said actuation unit is selectively operable to modify an orientation of said chip such that the predetermined field of view moves from the first viewing position towards a second viewing position from said LADAR module.

2. The apparatus in accordance with claim 1, wherein said actuation unit comprises at least one piezoelectric element coupled between said first substrate and said LADAR module, said at least one piezoelectric element configured to selectively bias said LADAR module to modify the orientation thereof when a bias voltage is applied to said at least one piezoelectric element.

3. The apparatus in accordance with claim 2, wherein said actuation unit comprises a plurality of voltage control circuits coupled at different positions along said at least one piezoelectric element, said plurality of voltage control circuits configured to apply one or more bias voltages to said at least one piezoelectric element at different times to move the predetermined field of view in more than one direction.

4. The apparatus in accordance with claim 2 further comprising a second substrate coupled between said first substrate and said LADAR module, and coupled between said actuation unit and said LADAR module, wherein said at least one piezoelectric element is configured to selectively bias said second substrate to modify the orientation of said LADAR module when the bias voltage is applied to said at least one piezoelectric element.

5. The apparatus in accordance with claim 4, wherein said at least one piezoelectric element comprises a plurality of piezoelectric elements coupled at different positions between said first substrate and said second substrate, said plurality of piezoelectric elements configured to selectively bias said second substrate at different times to move the predetermined field of view in more than one direction.

6. The apparatus in accordance with claim 1, wherein said plurality of scanning components comprises at least one microelectromechanical system.

7. A laser distance and ranging (LADAR) array comprising:

a plurality of LADAR modules coupled to a first substrate, each LADAR module comprising a chip and a plurality of scanning components coupled to the chip, said plurality of scanning components comprising a light source and a light receiver, wherein each LADAR module is configured to scan with a predetermined field of view in a viewing position from each LADAR module; and an actuation unit coupled to each LADAR module defining a plurality of actuation units, wherein said plurality of actuation units are selectively operable to modify an orientation of said chip of at least one LADAR module such that the viewing position for the predetermined field of view of the at least one LADAR module moves relative to the viewing position for the predetermined field of view of a different LADAR module.

8. The array in accordance with claim 7, wherein said plurality of LADAR modules comprises a first LADAR module having a first predetermined field of view in a first viewing position and a second LADAR module having a second predetermined field of view in a second viewing position, said plurality of actuation units configured to modify the orientation of at least one of said first and second LADAR modules such that the first and second predetermined fields of view are moved into alignment with each other.

9. The array in accordance with claim 8, wherein said plurality of actuation units are configured to modify the orientation of at least one of said first and second LADAR modules such that the first and second predetermined fields of view at least partially overlap with each other.

10. The array in accordance with claim 8, wherein said plurality of actuation units are configured to modify the orientation of at least one of said first and second LADAR modules such that the first and second predetermined fields of view entirely overlap with each other.

11. The array in accordance with claim 8, wherein said plurality of actuation units are configured to modify the orientation of at least one of said first and second LADAR modules such that the first and second predetermined fields of view are positioned adjacent to each other to define a substantially continuous field of view.

12. The array in accordance with claim 7 further comprising a first substrate coupled to said actuation unit, wherein said actuation unit comprises at least one piezoelectric element coupled between said first substrate and said LADAR module, said at least one piezoelectric element configured to selectively bias said LADAR module to modify the orientation thereof when a bias voltage is applied to said at least one piezoelectric element.

13. The array in accordance with claim 12, wherein said actuation unit comprises a plurality of voltage control circuits coupled at different positions along said at least one piezoelectric element, said plurality of voltage control circuits configured to apply one or more bias voltages to said at least one piezoelectric element at different times to move the predetermined field of view in more than one direction.

14. The array in accordance with claim 12 further comprising a second substrate coupled between said first substrate and said LADAR module, and coupled between said actuation unit and said LADAR module, wherein said at least one piezoelectric element is configured to selectively bias said second substrate to modify the orientation of said LADAR module when the bias voltage is applied to said at least one piezoelectric element.

15. The array in accordance with claim 14, wherein said at least one piezoelectric element comprises a plurality of piezoelectric elements coupled at different positions between said first substrate and said second substrate, said plurality of piezoelectric elements configured to selectively bias said second substrate at different times to move the predetermined field of view in more than one direction.

16. A method of assembling a laser distance and ranging (LADAR) array, said method comprising:

arranging a plurality of LADAR modules on a first substrate, each LADAR module comprising a chip and a plurality of scanning components coupled to the chip, the plurality of scanning components comprising a light source and a light receiver, wherein each LADAR module has a predetermined field of view oriented in a viewing position; and coupling an actuation unit to each LADAR module defining a plurality of actuation units, wherein said plurality of actuation units are selectively operable to modify an orientation of the chip of at least one LADAR module of the plurality such that the viewing position for the predetermined field of view of the at least one LADAR module moves relative to the viewing position for the predetermined field of view of a different LADAR module.

17. The method in accordance with claim 16, wherein coupling an actuation unit comprises coupling at least one piezoelectric element between the first substrate and the LADAR module, said at least one piezoelectric element configured to selectively bias the LADAR module to modify the orientation thereof when a bias voltage is applied to the at least one piezoelectric element.

18. The method in accordance with claim 17 further comprising coupling a plurality of voltage control circuits at different positions along the at least one piezoelectric element, the plurality of voltage control circuits configured to apply one or more bias voltages to the at least one piezoelectric element at different times to move the predetermined field of view in more than one direction.

19. The method in accordance with claim 17, wherein coupling an actuation unit comprises coupling a second substrate between the first substrate and the LADAR module, and between the actuation unit and the LADAR module, wherein the at least one piezoelectric element is configured to selectively bias the second substrate to modify the orientation of the LADAR module when the bias voltage is applied to the at least one piezoelectric element.

20. The method in accordance with claim 19 further comprising coupling a plurality of piezoelectric elements at different positions between the first substrate and the second substrate, the plurality of piezoelectric elements configured to selectively bias the second substrate at different times to move the predetermined field of view in more than one direction.

\* \* \* \* \*